G. B. PHILLIPS.
WAGON WRENCH.
No. 31,693. Patented Mar. 12, 1861.
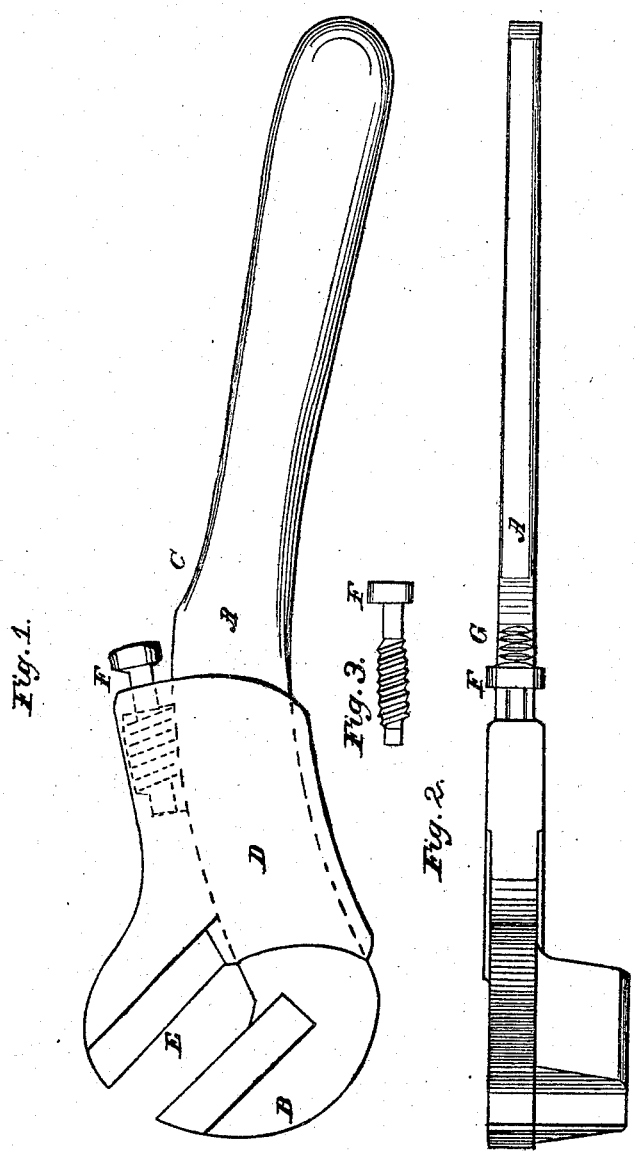
Inventor:
George B. Phillips.

UNITED STATES PATENT OFFICE.

GEO. B. PHILLIPS, OF NEWARK, NEW JERSEY, ASSIGNOR TO J. S. LITTELL, OF SAME PLACE.

WAGON-WRENCH.

Specification of Letters Patent No. 31,693, dated March 12, 1861.

*To all whom it may concern:*

Be it known that I, GEORGE B. PHILLIPS, of the city of Newark, in the county of Essex and State of New Jersey, have invented certain new and useful Improvements in Wagon-Wrenches; and I do hereby declare that the same is described and represented in the following specifications and drawings.

To enable others skilled in the art to make and use my improvements I will proceed to describe their construction and operation referring to the drawings in which the same letters indicate like parts in each of the figures.

Figure 1, is an elevation of my wagon wrench. Fig. 2, is a plan of same; Fig. 3, the screw which traverses the jaw.

The nature of my invention and improvements in wagon wrenches consists in curving the bar of the wrench in the segment of a circle and making the section of a female screw on the edge of the bar for the male screw to work in that traverses the jaw and slide of the wrench. Also in making some lips or projections on the side of the jaws at a right angle to the plane of the bar to turn nuts in cavities, or on the ends of axles within the hoop of the hub.

In the accompanying drawings A, is the main bar of the wrench with the jaw B, at one end; this bar is made in the form shown in the drawing, that is it is curved in the arc of a circle between B, and C, or that part on which the slide D, traverses. This slide D is made in the form shown in the drawing and provided with a jaw E, to correspond with the jaw B, to hold the articles to be turned. There is a recess in the inside of the slide D, shown by dotted lines in Fig. 1, for the screw F, to turn in; the thread of this screw works in the segments G, of a female screw in the edge of the bar A, between B, and C, as shown in Fig. 2, of the drawings. The screw F, is provided with a head by which it may be turned with the thumb and finger, to traverse the slide and jaw and adjust it to the nut or bolt to be turned by the wrench.

In order to turn nuts in holes or cavities, or the nuts on axles that are within the hoop of the hub, I make some lips or projections H, H, on the jaws B, and E, as shown in the drawing which are a great improvement, and a very important advantage to the wrench and render it far more serviceable than it would be without them for the purposes mentioned.

The screw F, may be made of a uniform size from end to end, or it may be made larger at the ends and small in the middle, and curved in the arc of a circle to correspond with the curved edge of the bar in which it works.

I believe I have described and represented my improvements in wagon wrenches, so as to enable any person skilled in the art to make and use them. I will now state what I desire to secure by Letters Patent.

I claim—

As a new article of manufacture the wrench described in the foregoing specification and represented in the accompanying drawing.

GEORGE B. PHILLIPS.

Witnesses:
G. A. MEEKER,
WM. BRADSHAW.